US005481193A

United States Patent [19]

Mueller et al.

[11] Patent Number: 5,481,193

[45] Date of Patent: Jan. 2, 1996

[54] REAL-TIME COMPUTERIZED ENGINE ANALYZER USING MULTIPLE ANALOG-TO-DIGITAL CONVERSION SYSTEM

[75] Inventors: Steve Mueller, Big Bend; Scott Meyers, West Allis; Chris Lambach, Milwaukee; Glenn Stern, West Bend; Joseph Cochenet, Sussex; John T. Werth, III, Waukesha; Carlos E. Rodriguez, Milwaukee; John N. Wozniak, Waukesha; John Hintz; Richard W. Hansen, both of New Berlin; Steve Trottier, Oconomowoc, all of Wis.

[73] Assignee: SPX Corporation, Muskegon, Mich.

[21] Appl. No.: 829,399

[22] Filed: Feb. 3, 1992

[51] Int. Cl.[6] .................. F02P 17/00; G06F 15/20; G06F 19/00; G06G 7/70

[52] U.S. Cl. .................. 324/379; 364/431.01

[58] Field of Search .................. 324/378, 379, 324/380; 341/156; 364/431.01, 431.03, 431.04, 487, 484

[56] References Cited

U.S. PATENT DOCUMENTS

| | | | |
|---|---|---|---|
| 4,267,569 | 5/1981 | Baumann et al. | 324/379 |
| 4,476,531 | 10/1984 | Marino et al. | 324/379 |
| 4,812,768 | 3/1989 | Quinn . | |
| 4,937,579 | 6/1990 | Maio et al. | 341/156 |
| 5,109,188 | 4/1992 | Sanderson et al. | 364/484 |
| 5,180,971 | 1/1993 | Montijo | 324/121 R |

*Primary Examiner*—Walter E. Snow
*Attorney, Agent, or Firm*—Kinney & Lange

[57] ABSTRACT

An engine analyzer for an internal combustion engine converts an engine waveform into a digital waveform which is displayed on a monitor. The waveform is converted using two analog-to-digital (A/D) conversion channels. A dedicated A/D control microprocessor is used to control the flow of the digital waveform data between the analog-to-digital conversion channels and a main computer. Waveform data transfer to the main computer is over a dedicated, high speed data bus. A peripheral control microprocessor is used to monitor other engine parameters and shares memory with the A/D control microprocessor.

29 Claims, 3 Drawing Sheets

REAL-TIME COMPUTERIZED ENGINE ANALYZER USING MULTIPLE ANALOG-TO-DIGITAL CONVERSION SYSTEM

BACKGROUND OF THE INVENTION

The present invention relates to engine analyzers used for testing internal combustion engines. In particular, the invention relates to displaying waveforms generated by an internal combustion engine.

One common type of engine analyzer used for testing an internal combustion engine employs a cathode ray tube having a display screen on which analog waveforms are displayed which are associated with operation of the engine. In a typical apparatus of this type, a substantial horizontal trace is produced on the screen of the cathode ray tube by applying a sawtooth ramp voltage between the horizontal deflection plates of the tube while the analog signal being measured is applied to the vertical deflection plates of the tube. The typical analog signals which are applied to the vertical plates of the cathode ray tube are the primary voltage which exists across the primary winding of the ignition coil, and a signal representative of the secondary voltage of the ignition coil. These voltages are affected by the condition of various elements of the ignition system of the engine, such as the spark plugs.

In the case of a multicylinder internal combustion engine, the primary and secondary voltage waveforms have typically been displayed on the cathode ray tube in one of two ways. In one case, the waveform being displayed represents a complete cycle of the engine, in which the conditions associated with the various cylinders are displayed sequentially in a predetermined pattern. This type of display has commonly been referred to as a "parade" pattern or display.

In the other common method of displaying waveforms, there are a plurality of horizontal traces, one above the other, with each trace being associated with the operation of one of the cylinders of the engine. The number of horizontal traces usually corresponds to the number of cylinders on the engine. This method of displaying waveforms has been referred to in the industry as a "raster" display. Analog displays are desirable because they are able to display high frequency waveforms in real-time.

With the advent of low cost microelectronic devices, and in particular microprocessors, digital electronic systems have found increasing use in a wide variety of applications. Digital electronic systems have many significant advantages over analog systems, including increased ability to analyze and store data, higher accuracy, greater flexibility in design and application, and the ability to interface with computers having larger and more sophisticated data processing and storage capabilities. U.S. Pat. No. 4,399,407 issued to Kling et al. on Aug. 16, 1983, entitled ENGINE ANALYZER WITH CONSTANT WIDTH DIGITAL WAVEFORM DISPLAY and U.S. Pat. No. 4,476,531 issued to Marino et al. on Oct. 9, 1984, entitled ENGINE ANALYZER WITH DIGITAL WAVEFORM DISPLAY are examples of an engine analyzer using a digital waveform display, and are incorporated herein by reference.

Typically, digital waveform displays in engine analyzer systems have been unable to display "live" engine waveforms. This is due to the slow speed of the waveform conversion and display circuitry and the high frequency of some engine waveforms. For example, an engine analyzer typically takes an entire set of samples over the desired portion of an engine waveform and stores the samples in memory. After the waveform is sampled, converted to a digital format and stored, the engine analyzer retrieves the samples from memory, converts them into a display format and displays the samples on a waveform display.

There is a continuing need for improved engine waveform displays in internal combustion engine analyzers.

SUMMARY OF THE INVENTION

The present invention offers an improved method and apparatus for displaying an engine waveform in an internal combustion engine analyzer. Analog electrical input waveforms are digitized by the present invention, and the digitized input waveform is stored in the form of digital data. Processor means, preferably a digital computer such as a microprocessor, selects digital data which has been stored. Display means displays a simulated visual representation of an analog waveform based upon the selected digital data.

In the present invention, engine waveforms are provided to two independent analog-to-digital conversion channels. Each channel includes a multiplexer, a gain circuit, a peak detect circuit and an analog-to-digital converter. An analog-to-digital control microprocessor controls the two analog-to-digital conversion channels. A peripheral control microprocessor monitors RPM, engine temperature, engine vacuum, and other engine parameters. A main microprocessor controls overall system operation and generates a display based upon monitored engine parameters.

In the present invention, the rate of analog-to-digital conversion can be cut in half because the conversion is divided between two channels. Alternatively, each channel can monitor different engine waveforms to provide a dual trace display. Since a separate microprocessor controls analog-to-digital conversion, analog-to-digital conversion can occur in parallel with displaying of digitized engine waveforms. This provides a virtual real-time digital engine waveform. Additionally, the present invention uses a dedicated data bus to transfer digitized waveform data.

DETAILED DESCRIPTION OF THE PREFERRED EMBODIMENTS

Figure 1:
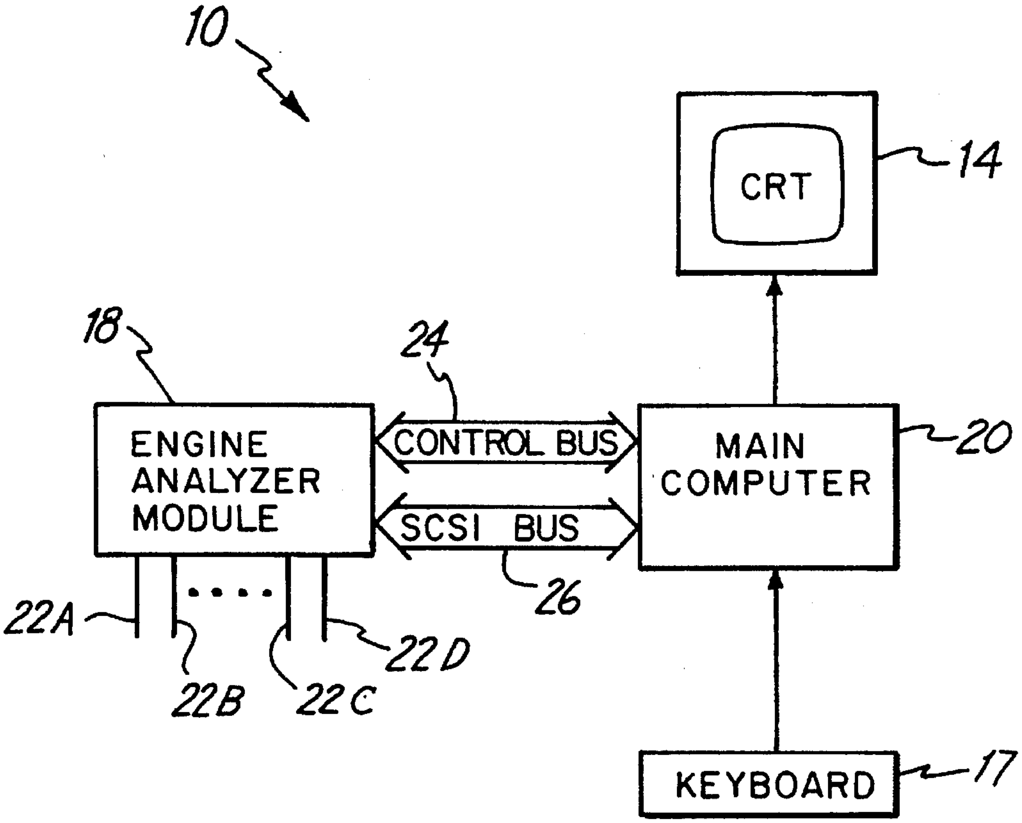
FIG. 1 is a block diagram showing an engine analyzer in accordance with the present invention.

In FIG. 1, engine analyzer system 10 is shown. Analyzer 10 includes cathode ray tube (CRT) raster scan display 14 and keyboard 17 for entering information. Analyzer system 10 includes an engine analyzer module 18 and a main computer 20. Extending from module 18 are a plurality of cables 22A, 22B, 22C, and 22D which are electrically connected to the circuitry within module 18, and which are intended for use during operation of the analyzer system 10. These cables include connections for a timing light, a "high tension" (HT) probe for sensing secondary voltage of the ignition system of an internal combustion engine of a vehicle (not shown). A "No. 1" probe 28 is used to sense the electrical signal being supplied to the No. 1 sparkplug of the ignition system. An "Engine Ground" connector, which is preferably an alligator-type clamp, is typically connected to the ground terminal of the battery of the ignition system. A "Points" connector, which is preferably an alligator-type clamp, is intended to be connected to one of the primary winding terminals of an ignition coil of the ignition system. A "Coil" connector, which is preferably an alligator-type, is intended to be connected to the other primary winding terminal of the ignition coil. Positive and negative DIS probes are included. DIS probes are capacitive pick-ups for coupling to spark plug wires of distributorless type ignition system engines. A "Battery" connector, preferably an alligator-type clamp, is connected to the "hot" or "non-ground" terminal of the battery of the ignition system. A vacuum transducer produces an electrical signal which is a linear function of vacuum or pressure, such as input manifold vacuum or pressure.

In the present invention, electrical signals derived from probes and received through cables 22A, 22B, 22C, and 22D are used to produce digitized waveforms which are stored as digital data in a digital memory. Upon request by an operator through user interface 17, analyzer system 10 of the present invention displays on display 14 waveforms derived from selected stored digital data. Waveforms displayed by raster scan display 14 are simulated virtual real-time representations of individual digitized waveforms.

Operation of engine analyzer system 10 is controlled by main computer 20, which communicates with engine analyzer module 18 by means of control bus 24. Bus 24 includes a data bus. In a preferred embodiment, main computer 20 is a microprocessor based digital computer.

The diagram of FIG. 1 also includes a SCSI data bus 26 which is connected between main computer 20 and engine analyzer module 18. SCSI bus 26 is a dedicated data bus used to rapidly transfer engine waveform information to main computer 20, in accordance with the present invention.

Main computer 20 controls of the operation of engine analyzer system 10 based upon a computer program stored in engine analyzer module 20. Digitized waveforms produced by engine analyzer module 18 are stored in a data memory of main computer 20.

When the operator selects a particular waveform by means of keyboard 17, main computer 20 retrieves virtual real-time digitized waveform data from SCSI bus 26, converts the digitized waveform into the necessary digital display data to reproduce the waveform on raster scan display 14, and transfers that digital display data to a display memory. As long as the digital display data is retained in display memory, raster scan display 14 continues to display the same waveform.

The display memory contains one bit for each picture element (pixel) that can be displayed on raster scan display 14. Each bit corresponds to a dot on the screen of raster scan display 14. In preferred embodiments of the present invention, the digitized waveform stored in a data memory represents individually sampled points on the waveform. Main computer 20 includes a stored display program which permits its microprocessor to "connect the dots" represented by the individual sampled points of the digitized waveform, so that the waveform displayed by raster scan display 14 is a reconstructed simulated waveform which has the appearance of a continuous analog waveform, rather than simply a series of individual dots. Main computer 20 determines the coordinates of the dot representing one digitized sampled point on the digitized waveform, determines the coordinates of the next dot, and then fills in the space between the two dots with additional intermediate dots to give the appearance of a continuous waveform. The digital display data stored in the display memory, therefore, includes bits corresponding to the individual sampled points on the input waveform, plus bits corresponding to the intermediate dots between these individual sampled points.

Engine analyzer system 10 has the capability of expansion to perform other engine test functions by adding other test modules. These modules can include, for example, an exhaust analyzer module and a battery/starter tester module. Modules interface with main computer 20 and provide digital data or digitized waveforms based upon the particular tests performed by those modules. In one embodiment, a modulator/demodulator (MODEM) (not shown) also interfaces with main computer 20 to permit analyzer system 10 to interface with a remote computer (not shown).

Figure 2:
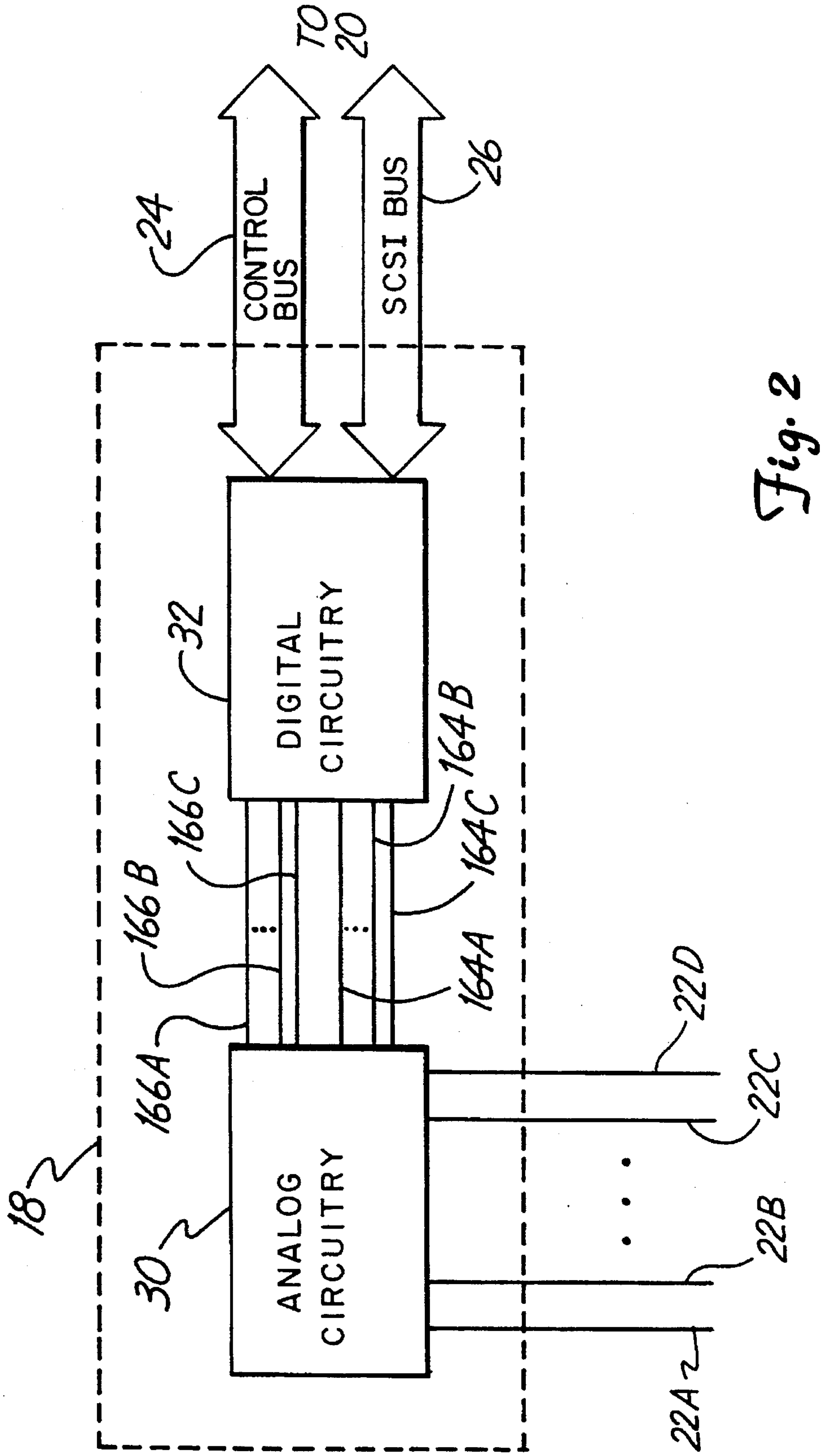
FIG. 2 is a block diagram of and engine analyzer module.

FIG. 2 is a block diagram of engine analyzer module 18. Analyzer module 18 includes analog circuitry block 30 and digital circuitry block 32. Analog circuitry block 30 connects to cables 22A, 22B, 22C, and 22D and receives engines signals from an internal combustion engine (not shown) which are related to engine operation. Operation of analog circuitry block 30 is described in U.S. Pat. Nos. 4,339,407 and 4,476,531. Analog circuitry block 30 is used for signal processing of incoming signals. The processed signals are provided to digital circuitry block 32 on data lines 164A, 164B, and 164C and 166A, 166B, and 166C. Digital circuitry block 32 is connected to main computer 20 (shown in FIG. 1) through control bus 24 and SCSI buss 26. SCSI bus 26 is used to transfer digitized waveform data to main microprocessor 20, in accordance with the present invention.

Figure 3:
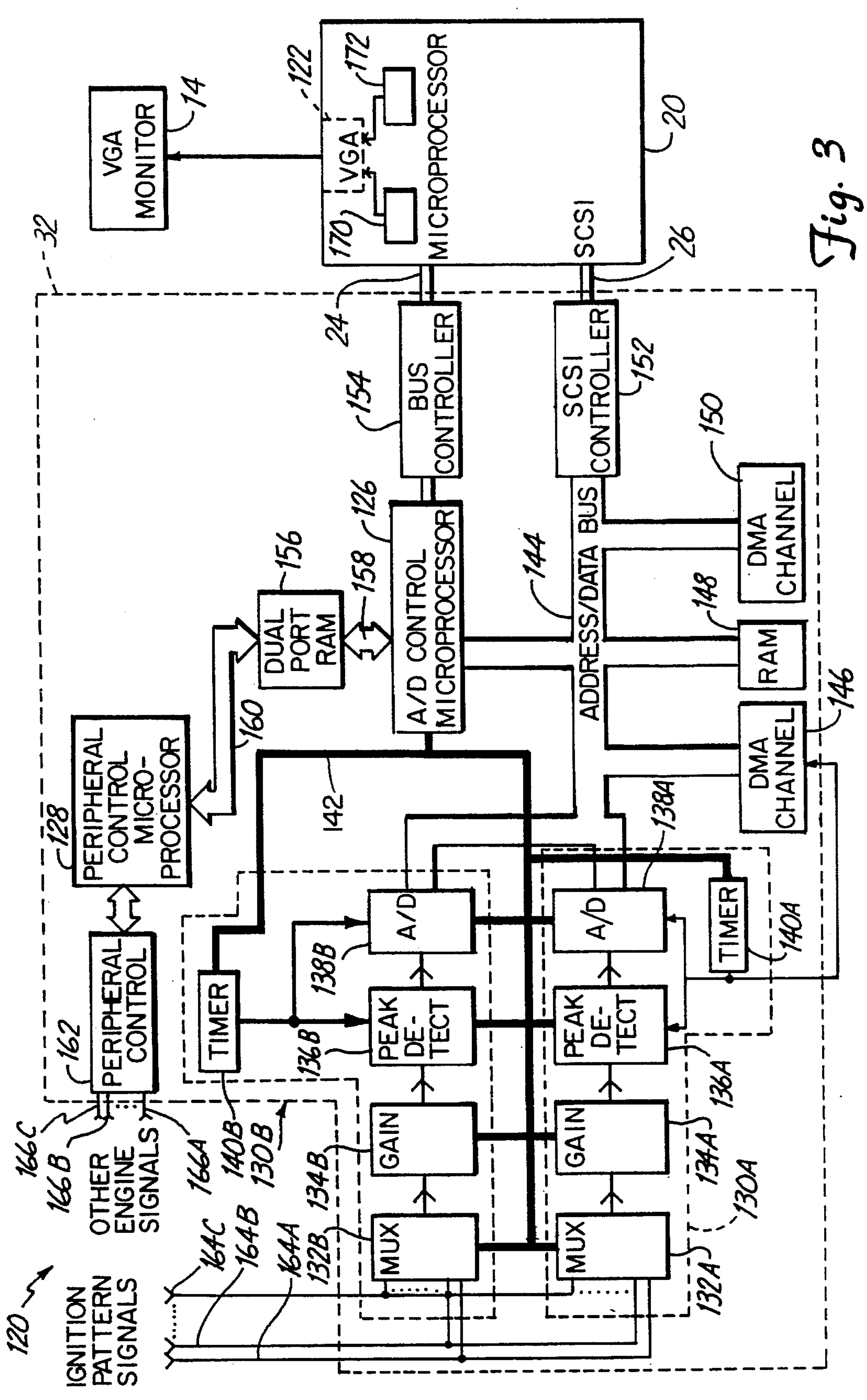
FIG. 3 is a block diagram of digital circuitry of an engine analyzer module in accordance with the present invention.

FIG. 3 is a block diagram 120 which shows a more detailed view of digital circuitry block 32 of engine analyzer module 18. Block 32 is connected to main microprocessor 20 through control bus 24 and SCSI bus 26. Main microprocessor 20 includes VGA (video graphics adaptor) circuitry 122 which connects to a display 14. In a preferred embodiment, display 14 comprises a VGA monitor.

Block 32 includes an analog-to-digital control microprocessor 126 and a peripheral control microprocessor 128. Analog-to-digital control microprocessor 126 is coupled to analog-to-digital input channels 130A and 130B, which operate in parallel. Channel 130A includes multiplexer 132A, gain circuit 134A, peak detect circuit 136A, analog-to-digital converter 138A and timer 140A. Channel 130B includes multiplexer 132B, gain circuit 134B, peak detect circuit 136B, analog-to-digital converter 138B and timer 140B. A control bus 142 connects analog-to-digital control microprocessor 126 to multiplexers 132A and 132B, gain circuits 134A and 134B, peak detect circuits 136A and 136B, analog-to-digital converters 138A and 138B and timers 140A and 140B.

Outputs from analog-to-digital converters 138A and 138B connect to an address/data bus 144. Bus 144 is also connected to analog-to-digital control microprocessor 126, direct memory access (DMA) channel 146, RAM 148, direct memory access (DMA) channel 150 and SCSI controller 152.

Analog-to-digital control microprocessor 126 connects to digital computer (microprocessor) 20 through control bus 24 and bus controller 154. Analog-to-digital control microprocessor 126 connects to dual port RAM 156 through address/data bus 158. Dual port RAM 156 also connects to peripheral control microprocessor 128 through address/data bus 160. Peripheral control microprocessor 128 is coupled to peripheral control circuitry 162.

In operation, engine waveforms to be digitized are provided to multiplexers 132A and 132B on input lines 164A, 164B and 164C which carry engine waveform signals provided by analog circuitry block 30. Analog-to-digital conversion channels 130A and 130B are connected to operate in parallel and receive control commands over control bus 142. Analog-to-digital control microprocessor 126 sends commands to multiplexers 132A and 132B over control bus 142 to control which input line, 164A, 164B or 164C is output by multiplexer 132A and 132B to gain circuits 134A and 134B, respectively. Multiplexers 132A and 132B are used to select which engine waveform will be received, converted into digital format and provided to processor circuitry for subsequent use.

The outputs of multiplexers 132A and 132B are provided to gain circuits 134A and 134B, respectively. Gain circuits 134A and 134B receive control commands from analog-to-digital microprocessor 126 through control bus 142 which control the gain provided by gain circuits 134A and 134B. The outputs of gain circuits 134A and 134B are provided to peak detect circuits 136A and 136B. Peak detect circuits 136A and 136B are used in some modes of operation of engine analyzer module 52 in which peaks in engine waveforms are detected and held at outputs of peak detectors 136A and 136B. Peak detectors 136A and 136B can detect either positive or negative peaks based upon instructions from analog-to-digital control microprocessor 126 provided through control bus 142. The outputs of peak detectors 136A and 136B are connected to analog-to-digital converters 138A and 138B, respectively. Analog-to-digital converters 138A and 138B convert an analog input into a digital representation of the amplitude of the input at the time of conversion. In a preferred embodiment of the present invention, analog-to-digital converters 138A and 138B each provide 8-bit digital outputs. Outputs from analog-to-digital converters 138A and 138B are provided to address/data bus 144.

Peak detectors 136A and 136B and analog-to-digital converters 138A and 138B are connected to timers 140A and 140B, respectively. Timers 140A and 140B receive instructions from analog-to-digital control microprocessor 126 through control bus 142. Timer 140A provides timing pulses to peak detect circuit 136A and analog-to-digital converter 138A and direct memory access channel 146. Timer 140B provides timing pulses to peak detect circuit 136B, analog-to-digital converter 138B and direct memory access channel 146. The timing pulses control the timing of analog-to-digital converters 138A and 138B, clear latched outputs on peak detect circuits 136A and 136B and control the transfer of the waveform data into RAM 148 through direct memory access channel 146.

Direct memory access channel 146 is connected to timers 140A and 140B and address/data bus 144. Direct memory access channel 146 is used to transfer digital data from the outputs of analog-to-digital converters 138A and 138B into RAM 148 at high speed and without interruption.

Direct memory access channel 150 is connected to address/data bus 144 and is used to transfer digitized waveform information from RAM 148 to SCSI controller 152, without significant delays or interruptions. Engine parameters, other than digitized waveforms, are transferred to main computer 20 through control bus 24.

Peripheral control microprocessor 128 is connected to main computer 20 through dual port RAM 156 and analog-to-digital control microprocessor 126. Peripheral control microprocessor 128 monitors various engine parameters through peripheral control circuitry 162. Peripheral control circuitry 162 is connected to an internal combustion engine using input lines 166A, 166B and 166C. These input lines are connected to, for example, vacuum sensors, electrical ground, engine coils, engine points, and high tension and No. 1 probes by analog circuitry block 30 shown in FIG. 2. Peripheral control microprocessor 128 receives signals from input lines 166A, 166B and 166C. Peripheral control microprocessor 128 uses this information to calculate various parameters, such as engine RPM, which are stored in dual port RAM 156 through address/data bus 160. These parameters are available to analog-to-digital control microprocessor 126 through address/data bus 158. Analog-to-digital control microprocessor 126 uses parameters stored in dual port RAM 156 to determine the sampling rate of analog-to-digital conversion channels 130A and 130B which are controlled by timers 140A and 140B, respectively.

Using the present invention, high sampling rates are achieved because different functions of engine analyzer system 10 are performed by discrete microprocessors 126 and 128. For example, as peripheral control microprocessor 128 determines engine RPM, analog-to-digital control microprocessor 126 is able to dedicate a larger percentage of its operating time to managing analog-to-digital conversion channels 130A and 130B. Additionally, as main computer 20 is responsible for driving monitor 124, analog-to-digital control microprocessor 126 can operate independent of the demands of display monitor 14.

To further increase the display speed of engine analyzer system 10, main computer 20 includes two video buffers, 170 and 172. While video from one video buffer (for example, buffer 170) is being output to VGA monitor 14, the other video buffer (buffer 172) is being loaded with waveform information provided over SCSI data bus 26.

The present invention provides dual channel analog-to-digital conversion through two analog-to-digital conversion channels 130A and 130B. Using multiplexers 132A and 132B, two engine waveforms can be monitored to provide a dual trace on monitor 14. In accordance with the present invention, conversion channels 130A and 130B can monitor the same engine waveform to achieve twice the analog-to-digital conversion rate. In this mode of operation, each channel 130A and 130B, alternates in taking samples from the same engine waveform. Alternating sampling is achieved by alternately triggering timers 140A and 140B with analog-to-digital control microprocessor 126. Direct memory access channel 146 alternately receives digital sample data from conversion channel 130A and 130B and loads the digital samples into RAM 148. By interleaving the two sets of data samples, a complete digital waveform can be generated at twice the temporal resolution possible with a single conversion channel. Additionally, in the present invention the system architecture uses a 16 bit data word, while the output of analog-to-digital converters 138A and 138B is an 8 bit data word. This allows a single data word transfer to carry waveform sample information simultaneously from both channel 130A and channel 130B.

The present invention provides the benefits of analog sample and display circuitry (the ability to provide high speed, virtual real-time waveforms) with the benefits of digital signal processing. The high speed of the present invention is achieved by using more than one analog-to-digital conversion channel, dedicated microprocessors, direct memory access channels for transferring waveform data and a data bus which is dedicated to waveform data transfer.

Although the present invention has been described with reference to preferred embodiments, workers skilled in the art will recognize that changes may be made in form and detail without departing from the spirit and scope of the invention. For example, additional analog-to-digital conversion channels and microprocessors may be used.

What is claimed is:

1. An apparatus for monitoring waveforms of an internal combustion engine, comprising:

means for providing a periodic analog input waveform representative of operation of the internal combustion engine;

first analog-to-digital converter means for converting the periodic analog waveform into a first digital signal representative of periodically sampled values of the periodic analog waveform sampled during a first portion of a sample period;

second analog-to-digital converter means for converting the periodic analog waveform into a second digital signal representative of periodically sampled values of the periodic analog waveform sampled during a second portion of the sample period different than the first portion, wherein sampled values carried in the first digital signal are taken at different times than sampled values carried in the second digital signal; and means for storing the first digital signal and the second digital signal.

2. The apparatus of claim 1 wherein the means for providing a periodic analog input waveform includes:

a first multiplexer, coupled to the engine for selecting the periodic analog waveform from a plurality of engine signals and providing the periodic analog waveform to the first analog-to-digital converter means; and a second multiplexer, coupled to the engine for selecting the periodic analog waveform from a plurality of engine signals and providing the periodic analog waveform to the second analog-to-digital converter means.

3. The apparatus of claim 1 including:

a dedicated data bus for transferring the first and second digital signals to a main controller.

4. The apparatus of claim 3 and further including:

an address/data bus for carrying digital data to the dedicated data bus; and a direct memory access channel for transferring digital data to the address/data bus.

5. The apparatus of claim 1 including:

analog-to-digital controller means for controlling the first analog-to-digital converter means and the second analog-to-digital converter means; and main controller means, coupled to the analog-to-digital controller means, for processing the first digital signal and the second digital signal.

6. The apparatus of claim 5 and further including:

peripheral controller means for monitoring parameters of the internal combustion engine and providing information related to engine RPM to the analog-to-digital controller means.

7. The apparatus of claim 6 and further including:

a dual port RAM connected to the analog-to-digital controller means and the peripheral controller means for transferring information therebetween.

8. The apparatus of claim 5 and further including:

display means coupled to the main controller means for displaying simulated engine waveforms based upon the first and second digital signals.

9. The apparatus of claim 8 wherein the simulated waveforms are an interleaved combination of the first and second digital signals to form a representation of a single waveform of the internal combustion engine.

10. An apparatus for analyzing parameters of an internal combustion engine comprising:

first analog-to-digital conversion means coupled to the internal combustion engine for converting a periodic analog waveform representative of operation of the internal combustion engine into a first digital signal representative of periodically sampled values of the periodic analog waveform sampled during a first portion of a sample period;

second analog-to-digital conversion means coupled to the internal combustion engine for converting the periodic analog waveform into a second digital signal representative of periodically sampled values of the periodic analog waveform sampled during a second portion of the sample period different than the first portion, wherein sampled values carried in the first digital signal are taken at different times than sampled values carried in the second digital signal;

main control means for displaying a waveform representative of the periodic analog waveform based upon the first digital signal and the second digital signal and for controlling system operation;

analog-to-digital control means for controlling operation of the first analog-to-digital conversion means and the second analog-to-digital conversion means based upon commands received from the main control means; and peripheral control means for monitoring parameters of the internal combustion engine and providing information related to engine RPM to the analog-to-digital control means.

11. The apparatus of claim 10 and further including:

a first multiplexer, coupled to the first analog-to-digital conversion means, for providing the periodic analog waveform from a plurality of engine signals to the first analog-to-digital conversion means; and a second multiplexer, coupled to the second analog-to-digital conversion means, for providing the periodic analog waveform from a plurality of engine signals to the second analog-to-digital conversion means.

12. The apparatus of claim 10 including:

a dedicated data bus for transferring digital waveform data from the first analog-to-digital conversion means and the second analog-to-digital conversion means to the main control means.

13. The apparatus of claim 12 and further including:

a command data bus connected to the main control means and the analog-to-digital control means, for transferring commands to the analog-to-digital control means and transferring engine parameter data to the main control means.

14. The apparatus of claim 10 and further including:

a dual port RAM connected to the analog-to-digital controller means and the peripheral control means for transferring information therebetween.

15. A method of monitoring waveforms representative of operation of an internal combustion engine, comprising:

receiving a periodic analog waveform representative of operation of the internal combustion engine;

sampling a first portion of the periodic analog waveform with a first analog-to-digital converter and providing a first digital sample waveform;

sampling a second portion of the periodic analog waveform with a second analog-to-digital converter and providing a second digital sample waveform, wherein the second portion of the periodic analog waveform occurs at a different time than the first portion of the periodic analog waveform;

combining the first digital sample waveform and the second digital sample waveform into a combined waveform; and displaying the combined waveform.

16. The method of claim 15 including transferring the first and second digital sample waveforms to a main computer using a dedicated data bus.

17. The method of claim 16 wherein the dedicated data bus is a SCSI data bus.

18. The method of claim 15 including monitoring engine RPM and controlling sampling using a peripheral control microprocessor.

19. A method of displaying waveforms representative of operation of an internal combustion engine, comprising:

receiving a periodic analog waveform representative of operation of the internal combustion engine;

converting the periodic analog waveform into first and second digital values representative of sampled values of the analog waveform, wherein converting the analog waveform to the first and second digital values comprises alternating sampling between first and second analog-to-digital converters, respectively, such that sampled values carried in the first digital values are taken at different times than sampled values carried in the second digital values;

transferring the digital values to a main computer using a dedicated data bus; and displaying a simulated engine waveform based upon the first and second digital values.

20. The method of claim 19 including storing the digital values prior to transferring the digital values to a main computer.

21. The method of claim 19 wherein converting the periodic analog waveform into digital values occurs at a sample rate, and including monitoring engine RPM and calculating the sample rate with a peripheral control microprocessor.

22. The method of claim 19 wherein the dedicated data bus is a SCSI data bus.

23. A method of displaying waveforms representative of operation of an internal combustion engine, comprising:

supplying a periodic analog signal from the internal combustion engine to a first analog-to-digital conversion channel;

supplying the periodic analog signal to a second analog-to-digital conversion channel;

alternating sampling of the periodic analog signal between the first analog-to-digital conversion channel which samples a first portion of the periodic analog signal; and the second analog-to-digital conversion channel which samples a second portion of the periodic analog signal different from the first portion, at a periodic sampling rate, and providing a plurality of digital samples for both the first and second portions of the periodic analog waveform;

transferring digital samples to a digital memory; and transferring digital samples stored in the digital memory to a display whereby a simulated analog waveform representative of the periodic analog signal is displayed on the display.

24. The method of claim 23 wherein transferring the digital samples to a digital memory comprises transferring the digital samples over a dedicated data bus.

25. The method of claim 24 wherein the dedicated data bus comprises a SCSI data bus.

26. The method of claim 23 including monitoring engine RPM and calculating the periodic sample rate based upon engine RPM.

27. The apparatus of claim 1 wherein the periodically sampled values representing the first and second digital signals are alternately sampled during the entire time period of the periodic analog waveform.

28. The apparatus of claim 10 wherein the periodically sampled values representing the first and second digital signals are alternately sampled during the entire time period of the periodic analog waveform.

29. The method of claim 15 wherein the first and second portions of the periodic analog waveform occur at alternating times with respect to each throughout the entire time period of the period analog waveform.

* * * * *